(12) United States Patent
Imasaka et al.

(10) Patent No.: US 10,639,594 B2
(45) Date of Patent: May 5, 2020

(54) ZEOLITE MEMBRANE, PRODUCTION METHOD THEREFOR, AND SEPARATION METHOD USING SAME

(71) Applicant: HITACHI ZOSEN CORPORATION, Osaka (JP)

(72) Inventors: Satoshi Imasaka, Osaka (JP); Masaya Itakura, Osaka (JP); Yasuhisa Hasegawa, Miyagi (JP); Koichi Sato, Miyagi (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 15/325,130

(22) PCT Filed: Jul. 6, 2015

(86) PCT No.: PCT/JP2015/069394
§ 371 (c)(1),
(2) Date: Jan. 10, 2017

(87) PCT Pub. No.: WO2016/006564
PCT Pub. Date: Jan. 14, 2016

(65) Prior Publication Data
US 2017/0189862 A1 Jul. 6, 2017

(30) Foreign Application Priority Data

Jul. 10, 2014 (JP) .................. 2014-142386

(51) Int. Cl.
*B01D 71/02* (2006.01)
*B01D 69/10* (2006.01)
(Continued)

(52) U.S. Cl.
CPC .......... *B01D 71/028* (2013.01); *B01D 53/22* (2013.01); *B01D 53/228* (2013.01);
(Continued)

(58) Field of Classification Search
None
See application file for complete search history.

(56) References Cited

U.S. PATENT DOCUMENTS

| 2009/0000475 A1 | 1/2009 | Fekety et al. |
| 2012/0024777 A1 | 2/2012 | Sugita et al. |
| 2014/0360938 A1 | 12/2014 | Hayashi et al. |

FOREIGN PATENT DOCUMENTS

| EP | 3132842 A1 | 2/2017 |
| JP | 2010-532259 | 10/2010 |
| JP | 2011-121854 | 6/2011 |
| JP | 2012-050930 | 3/2012 |
| JP | 2012045464 A | 3/2012 |

(Continued)

OTHER PUBLICATIONS

International Search Report dated Sep. 8, 2015 for Appln. No. PCT/JP2015/069394.
Hasegawa, Yasuhisa et al., "Preparation of High-Silica Chabazite Membrane", Membrane, 39(1), Jan. 1, 2014, pp. 56-60.

(Continued)

*Primary Examiner* — Krishnan S Menon
(74) *Attorney, Agent, or Firm* — Pillsbury Winthrop Shaw Pittman, LLP

(57) ABSTRACT

One object of the present invention is to provide a zeolite membrane that can achieve both practically sufficient separation performance and throughput and maintain the separation performance stably for a long period. Provided is a method of producing a zeolite membrane having CHA crystal structure on an intermediate layer of a porous support, wherein Si/Al (a molar ratio) of CHA zeolite particles is from 9.5 to 100.5 and, in an X-ray diffraction pattern obtained by applying X-ray onto a surface of the zeolite membrane, a peak intensity near $2\theta=18°$ is less than 0.5 times a peak intensity near $2\theta=21°$, and/or a peak intensity near $2\theta=10°$ is less than 4 times a peak intensity near (Continued)

2θ=21°, the method including: forming the zeolite membrane having the CHA crystal structure on the intermediate layer of the porous support by hydrothermal synthesis, using an aqueous reaction mixture including a Si element source, an Al element source, an alkali source, and an organic template, wherein non-dealuminated FAU zeolite is used as the Si element source and the Al element source.

9 Claims, 3 Drawing Sheets

(51) Int. Cl.
B01D 69/12 (2006.01)
C01B 39/48 (2006.01)
B01D 53/22 (2006.01)
B01D 67/00 (2006.01)
C01B 39/02 (2006.01)
B01J 20/18 (2006.01)
B01J 20/32 (2006.01)

(52) U.S. Cl.
CPC ......... *B01D 67/0051* (2013.01); *B01D 69/10* (2013.01); *B01D 69/12* (2013.01); *B01J 20/18* (2013.01); *B01J 20/3238* (2013.01); *C01B 39/026* (2013.01); *C01B 39/48* (2013.01); B01D 2256/24 (2013.01); B01D 2256/245 (2013.01); B01D 2257/504 (2013.01); B01D 2257/80 (2013.01); B01D 2323/12 (2013.01); B01D 2323/24 (2013.01); C01P 2004/62 (2013.01); C01P 2004/64 (2013.01); Y02C 10/10 (2013.01); Y02P 20/152 (2015.11)

(56) References Cited

FOREIGN PATENT DOCUMENTS

| WO | WO 2010/098473 | 9/2010 |
| WO | WO 2012/046545 | 4/2012 |
| WO | WO 2013/125660 | 8/2013 |

OTHER PUBLICATIONS

Itakura, Masaya et al., "Synthesis of high-silica CHA type zeolite by interzeolite conversion of FAU type zeolite in the presence of seed crystals", Microporous and Mesoporous Materials, 144, Mar. 24, 2011, pp. 91-96.
Extended European Search Report dated Jun. 13, 2017 in European Application 15818543.9.
Li, Xiansen et al., "Influence of the hydrothermal synthetic parameters on the pervaporative separation performances of CHA-type zeolite membranes", Microporous and Mesoporous Materials, Elsevier, Amsterdam, NL, vol. 143, No. 2, Mar. 4, 2011 (Mar. 4, 2011), pp. 270-276, XP028388036.
Yamanaka, Naoki et al., "Acid stability evaluation of CHA-type zeolites synthesized by interzeolite conversion of FAU-type zeolite and their membrane application for dehydration of acetic acid aqueous solution", Microporous and Mesoporous Materials, Elsevier, Amsterdam, NL, vol. 158. Mar. 15, 2012 (Mar. 15, 2012), pp. 141-147, XP028489674.
Zhou, Rongfei et al., "Preparation of chabazite membranes by secondary growth using zeolite-T-directed chabazite seeds", Microporous and Mesoporous Materials, vol. 179, Jun. 15, 2013 (Jun. 15, 2013), pp. 128-135, XP028689353.
Itakura, Masaya et al., "Synthesis of High-silica CHA Zeolite from FAU Zeolite in the Presence of Benzyltrimethylammonium Hydroxide", Chemistry Letters, Vol 37, No. 9, Jan. 1, 2008, pp. 908-909, XP055250258.

ZEOLITE MEMBRANE, PRODUCTION METHOD THEREFOR, AND SEPARATION METHOD USING SAME

CROSS-REFERENCE TO RELATED APPLICATIONS

This is the U.S. National Stage of PCT/JP2015/069394, filed Jul. 6, 2015, which in turn claims priority to Japanese Application No. 2014-142386, filed Jul. 10, 2014, the entire contents of all applications are incorporated herein by reference in their entireties.

TECHNICAL FIELD

The present invention relates to a zeolite membrane, a production method therefor, and a separation method using the same. A zeolite membrane according to the present invention achieves high separation performance and throughput in separation and collection of a target compound, and in particular, it can be suitably used for dehydration of organic compounds such as organic acids containing water.

BACKGROUND

Zeolite has regularly arranged micro pores and in general resists heat and chemicals, and therefore, it is used in various fields. Zeolite, which is alumino silicate having part of Si replaced with Al, has pores of a molecular order (about 0.3 to 1 nm) of oxygen 8- to 14-membered ring and has a stereoselective adsorption ability. Therefore, zeolite is widely used in the fields of, e.g., liquid separation, vapor separation, gas separation, membrane reactors, solid acid catalysts, separation adsorbents, and ion exchangers. The membrane separation method using a zeolite membrane has recently been proposed and employed in place of the distillation method which requires much heat energy for separation and collection of organic compounds from a mixture containing the organic compounds.

Zeolite is ordinarily produced by hydrothermal synthesis, in which an aluminum source, a silica source, an alkali metal, and an organic template such as an amine are added to a large amount of water, so as to achieve the target zeolite composition, the resulting mixture is placed in a pressure container such as an autoclave along with a porous support, the pressure container is sealed, and then the mixture is heated, thereby to synthesize a zeolite membrane on the support. The support is constituted by alumina, mullite, a porous metal, Vycor glass, etc. which may have seed crystals adhered thereto.

For example, Patent Literature 1 discloses a method for forming a zeolite membrane having the CHA crystal structure on a porous support by hydrothermal synthesis, using an aqueous reaction mixture including a Si element source, an Al element source, an alkali source including potassium, and 1-adamantine amine derivative as an organic template.

However, when the zeolite membrane having the CHA crystal structure obtained by this method is used as a separation membrane to separate and collect, e.g., acetic acid or 2-propanol from a mixture of water and acetic acid or a mixture of water and 2-propanol, respectively, the permeation flux (the mass of the permeating substance per unit time or unit area) is low and the throughput is small, and therefore, the separation takes a long time.

RELEVANT REFERENCES

List of Relevant Patent Literature

Patent Literature 1: Japanese Patent Application Publication No. 2011-121854

SUMMARY

The present invention addresses the above problem of the related art. One object of the present invention is to provide a zeolite membrane that can achieve both practically sufficient separation performance and throughput and maintain the separation performance stably for a long period Another object of the present invention is to provide a production method of such a high performance zeolite membrane and a separation method that uses the zeolite membrane and achieves high separation performance and throughput in separation and collection of a target compound.

To achieve the above objects, the present invention provides the production method of the zeolite membrane and the separation method using the zeolite membrane as described below.

(1) A method of producing a zeolite membrane having CHA crystal structure on an intermediate layer of a porous support, wherein Si/Al (a molar ratio) of CHA zeolite particles is from 9.5 to 100.5 and, in an X-ray diffraction pattern obtained by applying X-ray onto a surface of the zeolite membrane, a peak intensity near $2\theta=18°$ is less than 0.5 times a peak intensity near $2\theta=21°$, and/or a peak intensity near $2\theta=10°$ is less than 4 times a peak intensity near $2\theta=21°$, the method comprising: forming the zeolite membrane having the CHA crystal structure on the intermediate layer of the porous support by hydrothermal synthesis, using an aqueous reaction mixture including a Si element source, an Al element source, an alkali source, and an organic template, wherein non-dealuminated FAU zeolite is used as the Si element source and the Al element source.

(2) The method of producing a zeolite membrane according to (1), wherein seed crystals are used in the hydrothermal synthesis, and the seed crystals are prepared by hydrothermal synthesis using an aqueous reaction mixture including a Si element source, an Al element source, an alkali source, and an organic template with FAU zeolite used as the Si element source and the Al element source.

(3) The method of producing a zeolite membrane according to (2), wherein a particle size of CHA crystals is 100 nm to 1 μm.

(4) A separation method comprising: contacting a liquid or gas mixture containing a compound to be separated with the zeolite membrane produced by the method according to any one of (1) to (3), so as to allow permeation of a highly permeative substance for separating the compound from the mixture.

(5) The separation method according to (4) wherein the mixture containing the compound to be separated is a mixture of 2-propanol and water having water content of 10 wt % or more, and when the separation is performed under conditions of a temperature of 75° C. and a pressure difference across the membrane of 1 atm, then a permeation flux is 10 kg/(m$^2$h) or higher and a water concentration in a permeate is 99 wt % or higher.

(6) The separation method according to (4) wherein the mixture containing the compound to be separated is a mixture of acetic acid and water having water content of 30 wt % or more, and when the separation is performed under conditions of a temperature of 75° C. and a pressure difference across the membrane of 1 atm, then a permeation flux is 10 kg/(m²h) or higher and a water concentration in a permeate is 99 wt % or higher.

(7) The separation method according to (4) wherein the mixture containing the compound to be separated is a mixture gas of carbon dioxide and methane, ammonia, or sulfur hexafluoride having carbon dioxide content of 50 wt % or more, and when the separation is performed under conditions of a temperature of 40° C. and a pressure difference across the membrane of 3 atm, then a permeance of carbon dioxide is $1 \times 10^{-6}$ mol/(m²sPa) or higher.

(8) The separation method according to (4) wherein the mixture containing the compound to be separated is a mixture gas of carbon dioxide and methane, ammonia, or sulfur hexafluoride having carbon dioxide content of 50 wt % or more, and when the separation is performed under conditions of a temperature of 100 to 120° C. and a pressure difference across the membrane of 3 atm, then a permeance of carbon dioxide is $1 \times 10^{-7}$ mol/(m²sPa) or higher.

The zeolite membrane having the CHA crystal structure referred to in the present disclosure is a zeolite membrane having chabazite (CHA) structure prescribed by the International Zeolite Association (IZA), which may have the same crystal structure as the chabazite zeolites occurring in the nature.

In the present disclosure, an object having acid resistance is defined as one that undergoes no change in the structure thereof, less dealumination in the framework thereof, and almost no change in the Si/Al chemical composition thereof even after being immersed for five days in an ordinary inorganic acid or an organic acid aqueous solution such as acetic acid.

Advantages

The present invention is constituted as described above. Since the zeolite membrane is formed on an intermediate layer having a relatively small average pore size, formation of pinholes can be restrained and the zeolite membrane obtained is dense and thinner. In addition, since the support not contacted by the zeolite membrane has a larger average pore size than the intermediate layer, the support provides a high gas permeation flux. Therefore, the zeolite membrane can achieve both practically sufficient separation performance and throughput and maintain the separation performance stably for a long period. In particular, the zeolite membrane of the present invention has excellent acid resistance. The zeolite membrane of the present invention enables separation and collection of a target organic acid from a mixture of water and the organic acid such as acetic acid with a high permeation flux.

DESCRIPTION OF EXAMPLE EMBODIMENTS

Figure 1A:
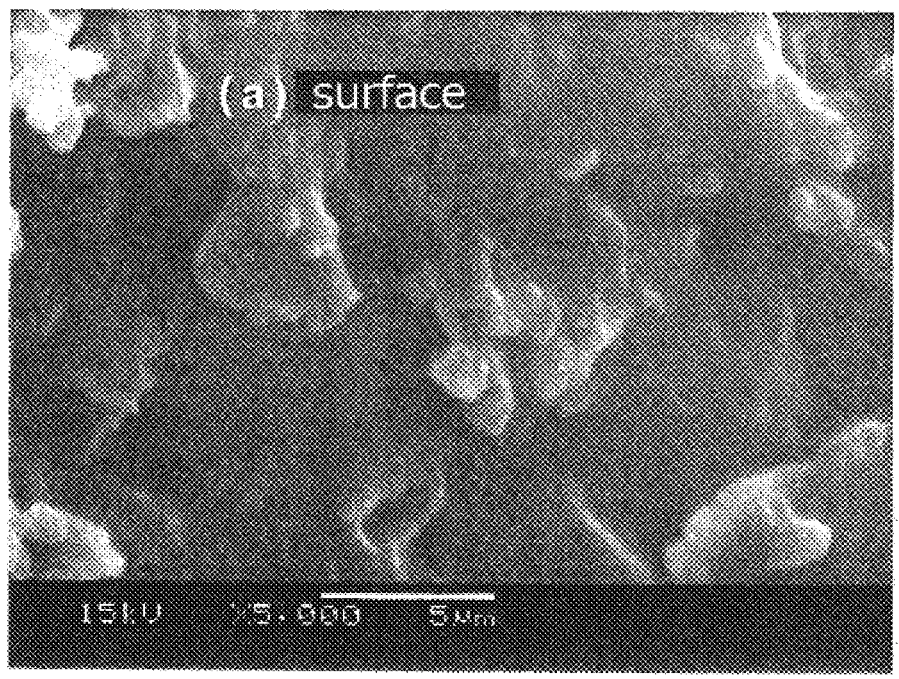
FIG. 1a is an electron microscope photograph showing a surface of a zeolite membrane of Example 1.

The present invention will be hereinafter described.

Porous Support Having Intermediate Layer

The porous support in the present invention has an intermediate layer on the surface and zeolite membrane is formed on the surface of the intermediate layer. The porous support, which is required to allow crystallization of zeolite as a film on the intermediate layer, may be made of metals such as alumina, silica, mullite, zirconia, titania, stainless steel, and aluminum or various alloys thereof, or made of an anodized film thereof. When a zeolite membrane formed on the porous support is to be used as a molecular sieve or the like, the average pore size or the like of the porous support may preferably be set such that (a) the porous support can bear the zeolite membrane firmly, (b) the pressure drop is as small as possible, and (c) the porous support has a sufficient self-supporting ability (mechanical strength). More specifically, the average pore size of the porous support may preferably be 10 to 50 μm. The thickness of the porous support including the intermediate layer may preferably be 1 to 3 mm. The average pore size of the intermediate layer may preferably be 0.1 to 1 μm. When the average pore size of the intermediate layer is larger than 1 μm, it is difficult to form a dense zeolite layer. When the average pore size of the intermediate layer is smaller than 0.1 μm, the permeation resistance of the intermediate layer is improperly large. The thickness of the intermediate layer may preferably be 1 to 50 μm, and more preferably be 1 to 10 μm. Further, the porosity of the porous support may preferably be 20 to 50%, and more preferably be 35 to 40%.

The shape of the porous support is not particularly limited, and may be tubular, tabular, honeycomb, hollow fiber-like, pellet-like, etc. For example, when the porous support has a tubular shape, the size thereof is not particularly limited, but practically the porous support may have a length of about 2 to 200 cm, an inner diameter of about 0.5 to 2 cm, and a thickness of about 0.5 to 4 mm.

The porous support may preferably be surface treated by washing with water, ultrasonic cleansing, or the like. For example, the surface of the support may be subjected to ultrasonic cleansing with water for 1 to 10 min. It may also be possible to grind the surface with emery paper or a grinder for increasing surface smoothness.

Synthesis of Zeolite Membrane

In the method of the present invention, a zeolite membrane having the CHA crystal structure may be formed on the intermediate layer of the porous support described above by hydrothermal synthesis, using an aqueous reaction mixture including a Si element source, an Al element source, an alkali source, and an organic template.

In hydrothermal synthesis, seed crystals may preferably be added to the synthetic system to promote crystallization of zeolite on the intermediate layer of the support. To add the seed crystals, the seed crystals may be added into the aqueous reaction mixture or adhered onto the intermediate layer of the support. If the seed crystals are previously adhered onto the intermediate layer of the support, the zeolite membrane formed may be dense and have excellent separation performance. The seed crystals used in hydrothermal synthesis may be CHA crystals prepared by hydrothermal synthesis using non-dealuminated FAU zeolite as a Si element source and an Al element source. The seed crystals may preferably have a small particle size, and may be ground as necessary. To adhere the seed crystals on the intermediate layer of the support, it may be possible to employ, for example, the dip method in which the seed crystals may be dispersed in a solvent such as water and the support may be immersed into the dispersion liquid to allow adhesion of the seed crystals, or a method in which the seed crystals may be mixed with a solvent such as water to prepare a slurry which may then be applied onto the surface of the support. The size of the seed crystals may preferably be 100 nm to 1 μm, and more preferably be 100 to 800 nm. When the size of the seed crystals is larger than 1 μm, a dense zeolite layer cannot be formed due to loss of equilibrium with the pore size of the intermediate layer of the support. Incidentally, the particle size of the seed crystals can be measured by the particle size analyzer (FPAR-1000) from Otsuka Electronics, Co., Ltd.

For hydrothermal synthesis, a pressure container such as an autoclave may be used. The porous support may be placed in the pressure container horizontally with respect to the pressure container, so as to avoid unevenness of concentration of a hydrothermal synthesis liquid caused by impact of gravity when in a vertical position.

In the method of the present invention, non-dealuminated FAU zeolite may be used as a Si element source and an Al element source. Use of the FAU zeolite may enable short time synthesis. In the present invention, the synthesis may be successfully completed in five hours. In contrast, Japanese Patent Application Publication No. 2011-121854 discloses that colloidal silica and aluminum hydroxide are used as a Si element source and an Al element source and the synthesis took 48 hours. Further, Japanese Patent Application Publication No. 2013-126649 discloses use of dealuminated FAU zeolite, but this requires sulfuric acid treatment of FAU and acid removal and thus is not industrially useful Since non-dealuminated FAU zeolite may be transformed into CHA zeolite during the hydrothermal synthesis reaction, a high-silica CHA zeolite membrane may be formed with a Si/Al ratio (molar ratio) of from 9.5 to 100.5. In the hydrothermal process, the FAU zeolite powder may be temporarily decomposed on the surface of the porous support, and then form, from the seed crystals, nuclei of zeolite having the same crystal structure as the seed crystals (i.e., the CHA structure). Alternatively, after FAU zeolite is decomposed, nuclei of zeolite having the CHA structure may be formed by the action of the organic template. The crystals of CHA zeolite may grow from the formed nuclei. Since the structural units of FAU zeolite and CHA zeolite are the same, a part of the structure of FAU zeolite may directly contribute to the crystallization of CHA zeolite. Therefore, there may be less possibility of having defects in the crystal structure. Further, since FAU zeolite used in the present invention is not dealuminated, the crystallinity of FAU zeolite is high, and the structure of FAU zeolite can be better utilized for synthesis of the CHA membrane.

A part of the formed nuclei may grow on the surface of the porous support and form the zeolite membrane covering the surface of the porous support. At this time, the CHA crystals may grow only to a particulate size, since there are a large number of formed nuclei. Therefore, the CHA membrane formed may be dense and have excellent permeability. Further, since the membrane may be constituted by the particulates, there is less possibility of having a grain boundary between the crystals, or cracking.

It may be possible to use commercially available FAU zeolite, such as HSZ-350HUA (USY (Ultra Stable Y), Si/Al (the molar ratio)=10, $Na_2O/Al_2O_3$=0.007) from Tosoh Corporation and HSZ-360HUA (USY (Ultra Stable Y), Si/Al (the molar ratio)=14, $Na_2O/Al_2O_3$=0.006) from Tosoh Corporation, and one or more types of FAU zeolite singly or combinedly.

In the method of the present invention, it may be preferable to use N,N,N-trimethyl-1-adamantane ammonium hydroxide as the organic template. Use of N,N,N-trimethyl-1-adamantane ammonium hydroxide may enable short time synthesis. In the present invention, the synthesis was successfully completed in five hours. In Japanese Patent Application Publication No. 2013-126649, benzyltrimethylammonium is used, but it takes seven days for the synthesis and thus is not suited for industrial applications.

In the method of the present invention, the conditions of hydrothermal synthesis such as the temperature and the time may be as usual, that is, 100 to 200° C., more preferably 120 to 150° C. and 5 hours to 15 days, more preferably 3 days to 7 days. After the hydrothermal synthesis is completed, the membrane may be taken out of the pressure container, washed with water to remove unnecessary gel-like substances on the surface of the membrane, dried in the air at a temperature ranging from a room temperature to 150° C., and fired to remove the organic template in the membrane layer. The firing may be performed at 400° C. or higher for 3 to 100 hours, and more preferably at 500 to 600° C. for 10 hours, and the temperature may be raised or lowered at a rate of 0.1 to 1° C. per minute to prevent cracking of the zeolite membrane due to thermal expansion.

Zeolite Membrane

In the zeolite membrane having the CHA crystal structure formed on the intermediate layer of the porous support by the method of the present invention, Si/Al (the molar ratio) of the CHA zeolite particles may be from 9.5 to 100.5, preferably 10 to 100, and more preferably 20 to 80. In the X-ray diffraction pattern obtained by applying X-ray onto the surface of the zeolite membrane, the peak intensity near 2θ=18° is less than 0.5 times, preferably less than 0.4 times, more preferably less than 0.35 times, and most preferably less than 0.25 times the peak intensity near 2θ=21°, and the peak intensity near 2θ=10° is less than 4 times, preferably less than 3 times, more preferably less than 2.5 times, and most preferably less than 0.2 times the peak intensity near 2θ=21°. The lower limit of the ratio of (the peak intensity near 2θ=18°)/(the peak intensity near 2θ=21°) is not limited but may ordinarily be 0.1. Also, the lower limit of the ratio of (the peak intensity near 2θ=10°)/(the peak intensity near 2θ=21°) is not limited but may ordinarily be 1.

Throughout the specification and the claims of the present application, the peak near 2θ=18° refers to a maximum peak out of peaks present in a range of 18°±0.6° among the peaks not assigned to the base material, the peak near 2θ=21° refers to the maximum peak out of peaks present in a range of 21°±0.6° among the peaks not assigned to the base material, and the peak near 2θ=10° refers to the maximum peak out of peaks present in a range of 10°±0.6° among the peaks not assigned to the base material, When Si/Al (the molar ratio) is within the above range, the formed zeolite membrane may be dense and strongly hydrophilic, and may selectively permeate hydrophilic compounds, water in particular, out of a mixture containing organic substances. In addition, the obtained zeolite membrane may resist acids and may be less susceptible to dealumination.

Si/Al (the molar ratio) may be obtained by scanning electron microscopy with energy dispersive X-ray spectroscopy (SEM-EDX).

The thickness of the zeolite membrane may preferably be 1 to 10 μm, and more preferably be 1 to 4 μm.

In the present invention, the CHA zeolite particles may preferably be nanoparticles having a size of 10 nm to 1 μm, and more preferably 10 to 100 nm. When the size of the CHA zeolite particles is larger than 1 μm, there may be a grain boundary between the zeolite crystals and the membrane is not dense.

The CHA zeolite particles are zeolite particles having the CHA structure prescribed by the International Zeolite Association (IZA), which may have the same crystal structure as the chabazite zeolites occurring in the nature. The CHA zeolite particles may have the structure including three-dimensional pores constituted by an oxygen 8-membered ring having a size of 3.8 by 3.8 Å, and the structure may be characterized by the X-ray diffraction data.

Separation Method

In the separation method of the present invention, the zeolite membrane of the present invention may be used for separation according to the ordinary methods. The zeolite membrane of the present invention can be suitably used for the separation and concentration methods called the pervaporation method and the vapor permeation method. For example, for a mixture of water and an organic compound, water may ordinarily permeate the zeolite membrane well. Therefore, water may be separated from the mixture, whereas the organic compound may be concentrated in the mixture.

The separation method of the present invention may be suitably applied to separation of carboxylic acid from an aqueous solution containing carboxylic acid represented by acetic acid, separation of alcohol from an aqueous solution containing alcohol such as 2-propanol, separation of ester from an aqueous solution containing ester such as acetate, and separation of carbon dioxide from a mixture gas of carbon dioxide and nitrogen, methane, ammonia, or sulfur hexafluoride.

More specifically, when a mixture of 2-propanol and water having water content of 10 wt % or more is subjected to a separation process by the method of the present invention under the conditions of a temperature of 75° C. and a pressure difference across the membrane of 1 atm, water may permeate the membrane with a permeation flux of 10 kg/(m²h) or higher and a water concentration in the permeate of 99 wt % or higher, so as to separate and collect 2-propanol When a mixture of acetic acid and water having water content of 30 wt % or more is subjected to a separation process under the conditions of a temperature of 75° C. and a pressure difference across the membrane of 1 atm, water may permeate the membrane with a permeation flux of 10 kg/(m²h) or higher and a water concentration in the permeate of 99 wt % or higher, so as to separate and collect acetic acid.

Further, when a mixture gas of carbon dioxide and methane, ammonia, or sulfur hexafluoride having carbon dioxide content of 50 wt % or more is subjected to a separation process under the conditions of a temperature of 40° C. and a pressure difference across the membrane of 3 atm, carbon dioxide may permeate the membrane with a permeance of $1 \times 10^{-6}$ mol/(m²sPa) or higher, and more preferably $2.5 \times 10^{-6}$ mol/(m²sPa) or higher, so as to separate carbon dioxide. The high-silica CHA membrane of the present invention can separate substances by the molecular sieve effect. Since the pore size of the CHA membrane may be 0.38 nm, carbon dioxide smaller than that can permeate, but methane, ammonium, and sulfur hexafluoride larger than that cannot permeate because of the molecular sieve effect.

Further, when a mixture gas of carbon dioxide and methane, ammonia, or sulfur hexafluoride having carbon dioxide content of 50 wt % or more is subjected to a separation process under the conditions of a temperature of 100 to 120° C. and a pressure difference across the membrane of 3 atm, carbon dioxide may permeate the membrane with a permeance of $1 \times 10^{-7}$ mol/(m²sPa) or higher, so as to separate carbon dioxide.

Next, the present invention will be described based on Examples, but the scope of the present invention is not limited to Examples described below.

EXAMPLE 1

<Formation of CHA Zeolite Membrane>

In Product Example 1 described below, the CHA zeolite membrane was formed by hydrothermal synthesis of CHA zeolite directly on the intermediate layer of an inorganic porous support.

PRODUCTION EXAMPLE 1

A cylindrical alumina support (from Hitachi Zosen Corporation with a diameter of 16 mm, a length of 60 mm, and an average pore size of 10 μm) having an intermediate layer (with a thickness of about 50 μm and an average pore size of 0.8 μm) on the surface thereof was provided. Seed crystals constituted by CHA zeolite were adhered onto the surface of the intermediate layer to a density of 25 g/m². The average pore size of the intermediate layer was measured in conformity to JIS K 3832.

The seed crystals, made from FAU zeolite, were previously prepared using N,N,N-trimethyl-1-adamantane ammonium hydroxide (TMAdaOH) as an organic template by the following method.

First, 8.09 g of TMAdaOH aqueous solution (from SACHEM, Inc., 25 wt %) was placed into a 50 ml beaker, 0.38 g of sodium hydroxide was added, and the whole was stirred for five minutes. Then, 2.1 g of HSZ-360 and 0.9 g of HSZ-390 (from Tosoh Corporation) were added as FAU zeolite, and the liquid mixture was stirred for 15 minutes. The molar composition of the liquid mixture thus obtained was as follows: TMAdaOH/$SiO_2$=0.2, NaOH/$SiO_2$=0.2, $H_2O$/$SiO_2$=7, and Si/Al=10.

Next, the liquid mixture was set in an inner cylinder of an autoclave made of Teflon (trademark), and the autoclave was sealed for hydrothermal synthesis at 160° C. for 40 hours. Then, the autoclave was cooled down, the gel in the Teflon inner cylinder was washed with an ion exchange water and centrifuged, and when the supernatant solution became neutral, water was added. Thus, a seed crystal dispersion liquid containing 5 wt % seed crystal was prepared. At this time, the particle size of the CHA seed crystals was 300 to 500 nm.

A support was immersed in the seed crystal dispersion liquid for 30 minutes, and then the support was taken out of the liquid and dried at 40° C. for one night. Thus, the seed crystals were adhered onto the support.

Next, a secondary growth solution for forming a zeolite membrane was prepared by the following method.

Into a 100 ml beaker, 1.04 g of TMAdaOH was placed, and 28.1 g of ion exchange water was added. Further, 0.13 g of NaOH was added, and the whole was stirred for five minutes. Then, 0.64 g of HSZ-360 and 0.32 g of HSZ-390 were added in the liquid mixture as FAU zeolite, and the liquid mixture was stirred for 3 hours. The secondary growth solution was thus prepared. The molar composition of the secondary growth solution was as follows: TMAdaOH/$SiO_2$=0.076, NaOH/$SiO_2$=0.2, $H_2O$/$SiO_2$=100, and Si/Al=10.

Next, the alumina support including the intermediate layer having the seed crystals adhered thereto was placed into the Teflon inner cylinder of the autoclave, and the inner cylinder was filled with the secondary growth solution. Then, the autoclave was sealed for hydrothermal synthesis at 160° C. for 16 hours. Thus, hydrothermal synthesis was performed in the secondary growth solution to form the CHA zeolite membrane on the intermediate layer of the support.

Figure 1B:
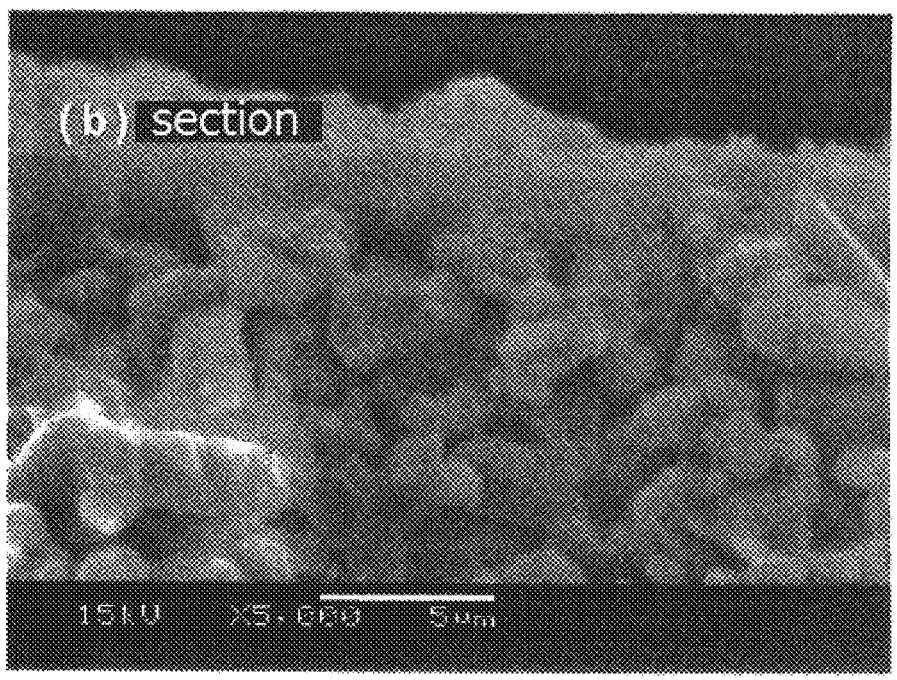
FIG. 1b is an electron microscope photograph showing a cross-section of the zeolite membrane of Example 1.

Then, the autoclave was cooled down, and the support having the zeolite membrane formed thereon was taken out of the inner cylinder and washed with the ion exchange water. Finally, the support was fired at 500° C. for ten hours in an electric furnace to remove the organic template. FIGS. 1a and 1b show an electron microscope photograph of the zeolite membrane obtained. FIG. 1a shows the surface of the membrane, and FIG. 1b shows a section of the membrane. The surface of the zeolite membrane was totally covered with particulates having a size of 10 to 100 nm, and the thickness thereof was 2 to 3 μm.

Figure 3:
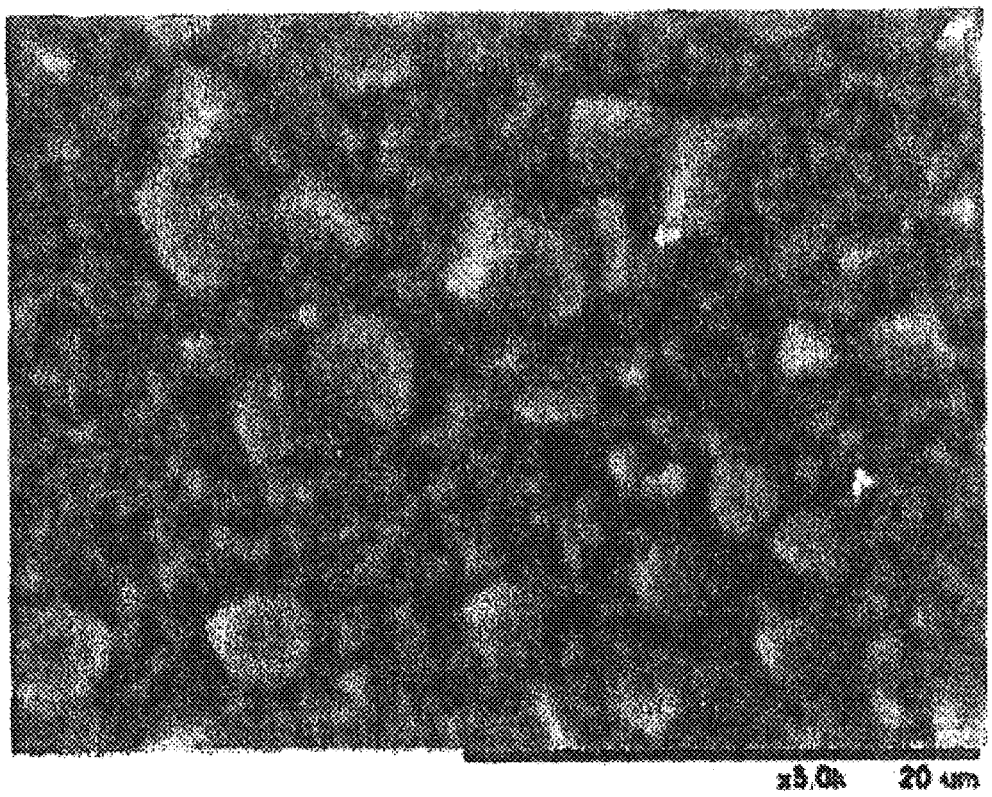
FIG. 3 is an electron microscope photograph of a surface of a zeolite membrane having the CHA structure with a small Al content (at the same magnification as in FIGS. 1a and 1b). This photograph appeared in the Proceedings of the 29th Zeolite Research Presentation Meeting on page 73.

By way of comparison, FIG. 3 shows an electron microscope photograph of a surface of a known zeolite membrane having the CHA structure with a small Al content (at the same magnification as in FIGS. 1a and 1b). As is obvious from comparison between FIG. 1a and FIG. 3, the zeolite membrane obtained in Production Example 1 has dense structure and maintained the ratio of Si/Al=10.

Figure 2:
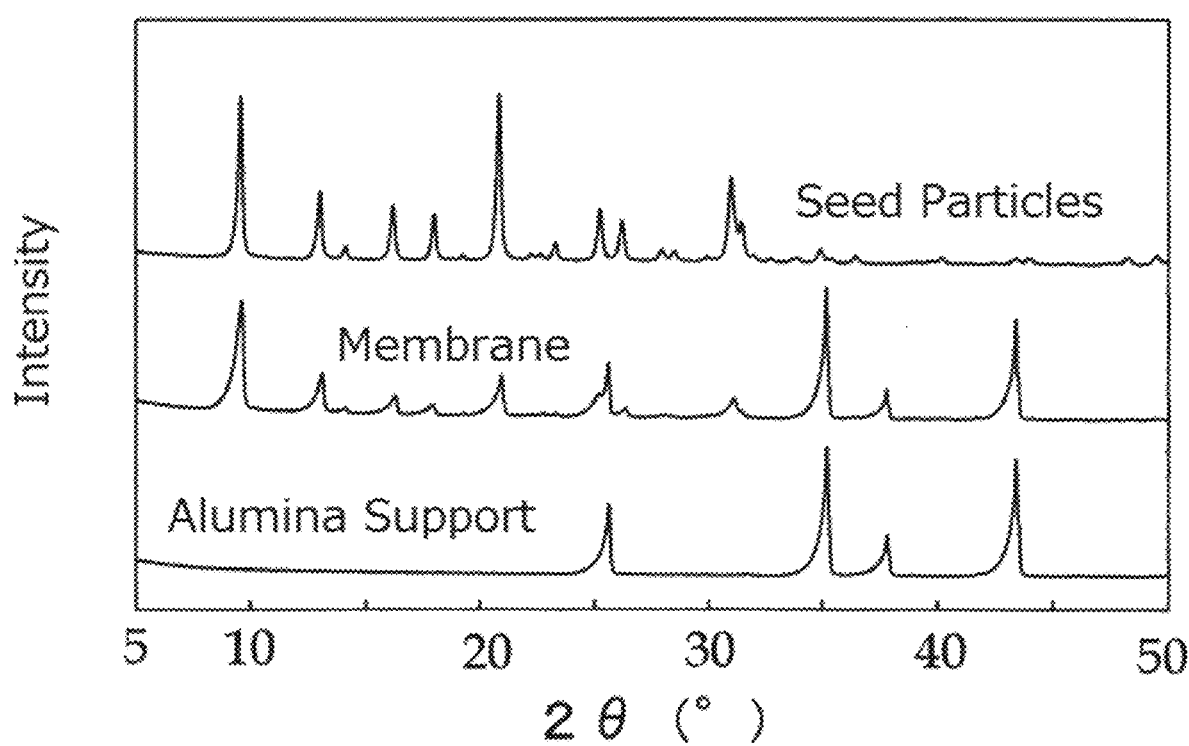
FIG. 2 shows an X-ray diffraction pattern of the zeolite membrane of Example 1.

Next, the zeolite membrane obtained was subjected to X-ray diffraction analysis (using Ultima IV from Rigaku Corporation). FIG. 2 shows the X-ray diffraction pattern obtained. This X-ray diffraction pattern confirmed that the membrane is constituted by CHA zeolite. In the X-ray diffraction pattern, the peak intensity near 2θ=18° is 0.3 times the peak intensity near 2θ=21°, and the peak intensity near 2θ=10° is 2.7 times the peak intensity near 2θ=21°.

PRODUCTION EXAMPLE 2 (the Impact of the Ratio of Si/Al=25)

A cylindrical alumina support (from Hitachi Zosen Corporation with a diameter of 16 mm, a length of 60 mm, and an average pore size of 10 μm) having an intermediate layer (with a thickness of about 50 μm and an average pore size of 0.8 μm) on the surface thereof was provided. Seed crystals constituted by CHA zeolite were adhered onto the surface of the intermediate layer to a density of 25 g/m².

The seed crystals were prepared in the same manner as in Production Example 1. Also, the seed crystals were adhered onto the support in the same manner as in Production Example 1.

Next, a secondary growth solution for forming a zeolite membrane was prepared in the same manner as in Production Example 1. The molar composition of the secondary growth solution was as follows: $TMAdaOH/SiO_2=0.076$, $NaOH/SiO_2=0.2$, $H_2O/SiO_2=100$, and Si/Al=25. The following steps were performed in the same manner as in Production Example 1. The X-ray diffraction analysis of the obtained zeolite membrane resulted in the same X-ray diffraction pattern as for the zeolite membrane of Production Example 1.

PRODUCTION EXAMPLE 3 (the Impact of the Ratio of Si/Al=50)

A cylindrical alumina support (from Hitachi Zosen Corporation with a diameter of 16 mm, a length of 60 mm, and an average pore size of 10 μm) having an intermediate layer (with a thickness of about 50 μm and an average pore size of 0.8 μm) on the surface thereof was provided. Seed crystals constituted by CHA zeolite were adhered onto the surface of the intermediate layer to a density of 25 g/m².

The seed crystals were prepared in the same manner as in Production Example 1. Also, the seed crystals were adhered onto the support in the same manner as in Production Example 1.

Next, a secondary growth solution for forming a zeolite membrane was prepared in the same manner as in Production Example 1. The molar composition of the secondary growth solution was as follows: $TMAdaOH/SiO_2=0.076$, $NaOH/SiO_2=0.2$, $H_2O/SiO_2=100$, and Si/Al=50. The following steps were performed in the same manner as in Production Example 1. The X-ray diffraction analysis of the obtained zeolite membrane resulted in the same X-ray diffraction pattern as for the zeolite membrane of Production Example 1.

PRODUCTION EXAMPLE 4 (the Impact of the Ratio of Si/Al=100)

A cylindrical alumina support (from Hitachi Zosen Corporation with a diameter of 16 mm, a length of 60 mm, and an average pore size of 10 μm) having an intermediate layer (with a thickness of about 50 μm and an average pore size of 0.8 μm) on the surface thereof was provided. Seed crystals constituted by CHA zeolite were adhered onto the surface of the intermediate layer to a density of 25 g/m².

The seed crystals were prepared in the same manner as in Production Example 1. Also, the seed crystals were adhered onto the support in the same manner as in Production Example 1.

Next, a secondary growth solution for forming a zeolite membrane was prepared in the same manner as in Production Example 1. The molar composition of the secondary growth solution was as follows: $TMAdaOH/SiO_2=0.076$, $NaOH/SiO_2=0.2$, $H_2O/SiO_2=100$, and Si/Al=100. The following steps were performed in the same manner as in Production Example 1. The X-ray diffraction analysis of the obtained zeolite membrane resulted in the same X-ray diffraction pattern as for the zeolite membrane of Production Example 1.

PRODUCTION EXAMPLE 5 (the Impact of the Ratio of Si/Al=110)

A cylindrical alumina support (from Hitachi Zosen Corporation with a diameter of 16 mm, a length of 60 mm, and an average pore size of 10 μm) having an intermediate layer (with a thickness of about 50 μm and an average pore size of 0.8 μm) on the surface thereof was provided. Seed crystals constituted by CHA zeolite were adhered onto the surface of the intermediate layer to a density of 25 g/m².

The seed crystals were prepared in the same manner as in Production Example 1. Also, the seed crystals were adhered onto the support in the same manner as in Production Example 1.

Next, a secondary growth solution for forming a zeolite membrane was prepared in the same manner as in Production Example 1. The molar composition of the secondary growth solution was as follows: $TMAdaOH/SiO_2=0.076$, $NaOH/SiO_2=0.2$, $H_2O/SiO_2=100$, and Si/Al=110. The following steps were performed in the same manner as in Production Example 1. The X-ray diffraction analysis of the obtained zeolite membrane resulted in the same X-ray diffraction pattern as for the zeolite membrane of Production Example 1.

<Measurement of Separation Performance>

TEST EXAMPLE 1

The separation performance of the zeolite membrane formed in the Production Example 1 was evaluated by the pervaporation method. More specifically, water was selectively allowed to permeate the zeolite membrane for separation from a mixture of water and 2-propanol mixed at a ratio of 50 wt % to 50 wt %. The conditions for separation were a temperature of 75° C. and the pressure difference across the membrane of 1 atm. As a result, the permeation flux was 32 kg/(m$^2$h), the separation factor α (water/2-propanol) was 386, and the water concentration in the permeate was 99.7 wt %.

TEST EXAMPLE 2

The separation was performed on a mixture of water and 2-propanol mixed at a ratio of 20 wt % to 80 wt %. In other respects, this example was conducted in the same manner as Test Example 1. As a result, the permeation flux was 20 kg/(m$^2$h), the separation factor α (water/2-propanol) was 1128, and the water concentration in the permeate was 99.6 wt %.

TEST EXAMPLE 3

The separation was performed on a mixture of water and 2-propanol mixed at a ratio of 10 wt % to 90 wt %. In other respects, this example was conducted in the same manner as Test Example 1. As a result, the permeation flux was 10 kg/(m$^2$h), and the water concentration in the permeate was 99.6 wt %.

TEST EXAMPLE 4

The separation was performed on a mixture of water and acetic acid mixed at a ratio of 50 wt % to 50 wt %. In other respects, this example was conducted in the same manner as Test Example 1. As a result, the permeation flux was 10 kg/(m$^2$h), and the water concentration in the permeate was 99.9 wt %.

TEST EXAMPLE 5

The gas separation performance of the zeolite membrane formed in the Production Example 1 was evaluated. More specifically, carbon dioxide was selectively allowed to permeate the zeolite membrane for separation from a mixture of carbon dioxide and methane mixed at a molar ratio of 50% to 50%. The conditions for separation were a temperature of 40° C. and the pressure difference across the membrane of 3 atm. As a result, the permeance was 1.2E-06 mol/(m$^2$sPa), and the separation factor α was 10.

TEST EXAMPLE 6

The separation was performed at a temperature of 100° C. In other respects, this example was conducted in the same manner as Test Example 5. As a result, the permeance was 1.2E-06 mol/(m$^2$sPa), and the separation factor α was 22.

TEST EXAMPLE 7

The separation was performed at a temperature of 120° C. In other respects, this example was conducted in the same manner as Test Example 5. As a result, the permeance was 1.0E-06 mol/(m$^2$sPa), and the separation factor α was 21.

Table 1 shows a summary of the test conditions and the test results of Test Examples 1 to 4, and Table 2 shows a summary of the test conditions and the test results of Test Examples 5 to 7. As compared to Patent Literature 1, these results indicate high permeation rates which confirm superiority of the present invention.

TABLE 1

(Test Examples 1 to 4)

| | Test Conditions | | Test Results | | |
|---|---|---|---|---|---|
| Liquid to be Treated | Concentration in Supplied Liquid [wt. %] | Temp. [° C.] | Water Content in Permeate [wt. %] | Separation Factor α [—] | Permeation Flux [kg/m$^2$h] |
| Water/IPA | 50/50 | 75 | 99.7 | 386 | 32 |
| | 20/80 | 75 | 99.6 | 1128 | 20 |
| | 10/90 | 75 | 99.6 | 2538 | 10 |
| Water/Acetic Acid | 50/50 | 75 | 99.9 | 24000 | 10 |

TABLE 2

(Test Examples 5 to 7)

| Test Conditions | | Test Results | |
|---|---|---|---|
| Gas to be Treated | Temp. [° C.] | Separation Factor α [—] | Permeance [mol/(m$^2$sPa)] |
| Carbon Dioxide/ Methane (50/50) | 40 | 10 | 1.2E−06 |
| | 100 | 22 | 1.2E−06 |
| | 120 | 21 | 1.0E−06 |

As shown in Tables above, the zeolite membrane of the present invention exhibited high separation performance in any of the systems.

TEST EXAMPLE 8

The gas separation performance of the zeolite membrane formed in the Production Example 2 was evaluated Carbon dioxide was selectively allowed to permeate the zeolite membrane for separation from a mixture of carbon dioxide and methane mixed at a molar ratio of 50% to 50%. The conditions for separation were a temperature of 40° C. and the pressure difference across the membrane of 3 atm. As a result, the permeance was 1.4E-06 mol/(m$^2$sPa), and the separation factor α was 122.

TEST EXAMPLE 9

The separation was performed at a temperature of 100° C. In other respects, this example was conducted in the same manner as Test Example 8. As a result, the permeance was 9.5E-07 mol/(m$^2$sPa), and the separation factor α was 66.

TEST EXAMPLE 10

The separation was performed at a temperature of 120° C. In other respects, this example was conducted in the same manner as Test Example 8. As a result, the permeance was 7.1E-07 mol/(m$^2$sPa), and the separation factor α was 47.

TABLE 3

(Test Examples 8 to 10)

| Test Conditions | | Test Results | |
|---|---|---|---|
| Gas to be Treated | Temp. [° C.] | Separation Factor α [—] | Permeance [mol/(m$^2$sPa)] |
| Carbon Dioxide/ Methane (50/50) | 40 | 122 | 1.4E−06 |
| | 100 | 66 | 9.5E−07 |
| | 120 | 47 | 7.1E−07 |

With the ratio of Si/Al being 25, the separation for the mixture of carbon dioxide and methane was performed at high performance.

TEST EXAMPLE 11

The separation performance of the zeolite membrane formed in the Production Example 3 was evaluated by the pervaporation method. The separation was performed on a mixture of water and acetic acid mixed at a ratio of 30 wt % to 70 wt %. In other respects, this example was conducted in the same manner as Test Example 1. As a result, the permeation flux was 10 kg/(m$^2$h), and the separation factor was 155.

TEST EXAMPLE 12

The separation performance of the zeolite membrane formed in the Production Example 4 was evaluated by the pervaporation method. The separation was performed on a mixture of water and 2-propanol mixed at a ratio of 50 wt % to 50 wt %. In other respects, this example was conducted in the same manner as Test Example 1. As a result, the permeation flux was 50 kg/(m$^2$h), and the separation factor was 30.

TEST EXAMPLE 13

The separation performance of the zeolite membrane formed in the Production Example 4 was evaluated by the pervaporation method. The separation was performed on a mixture of water and acetic acid mixed at a ratio of 30 wt % to 70 wt %. In other respects, this example was conducted in the same manner as Test Example 1. As a result, the permeation flux was 15 kg/(m$^2$h), and the separation factor was 20.

TEST EXAMPLE 14

The separation performance of the zeolite membrane formed in the Production Example 5 was evaluated by the pervaporation method. The separation was performed on a mixture of water and 2-propanol mixed at a ratio of 50 wt % to 50 wt %. In other respects, this example was conducted in the same manner as Test Example 1. As a result, the permeation flux was 90 kg/(m$^2$h), and the separation factor was 1. Thus, the membrane was not dense.

Table 4 shows a summary of these Test Examples.

TABLE 4

(Test Examples 1 to 14)

| | Zeolite | | Separation Mixture | | | Permeation | | |
|---|---|---|---|---|---|---|---|---|
| | Composite Membrane | Si/Al Ratio | Separation Type | Concentration | Temp. [° C.] | Flux kg/m$^2$h | Permeance mol/(m$^2$sPa) | Separation Factor |
| Test Example 1 | Production Example 1 | 10 | 2-Propanol/Water | 50/50 | 75 | 32 | — | 386 |
| Test Example 2 | Production Example 1 | 10 | 2-Propanol/Water | 80/20 | 75 | 20 | — | 1128 |
| Test Example 3 | Production Example 1 | 10 | 2-Propanol/Water | 90/10 | 75 | 10 | — | 2538 |
| Test Example 4 | Production Example 1 | 10 | Acetic Acid/Water | 50/50 | 75 | 10 | — | 24000 |
| Test Example 5 | Production Example 1 | 10 | CO2/CH4 | 50/50 | 40 | — | 1.2E−06 | 10 |
| Test Example 6 | Production Example 1 | 10 | CO2/CH4 | 50/50 | 100 | — | 1.2E−06 | 22 |
| Test Example 7 | Production Example 1 | 10 | CO2/CH4 | 50/50 | 120 | — | 1.0E−06 | 21 |
| Test Example 8 | Production Example 2 | 25 | CO2/CH4 | 50/50 | 40 | — | 1.4E−06 | 122 |
| Test Example 9 | Production Example 2 | 25 | CO2/CH4 | 50/50 | 100 | — | 9.5E−07 | 66 |
| Test Example 10 | Production Example 2 | 25 | CO2/CH4 | 50/50 | 120 | — | 7.1E−07 | 47 |
| Test Example 11 | Production Example 3 | 50 | Acetic Acid/Water | 70/30 | 75 | 10 | — | 155 |
| Test Example 12 | Production Example 4 | 100 | 2-Propanol/Water | 50/50 | 75 | 50 | — | 30 |
| Test Example 13 | Production Example 4 | 100 | Acetic Acid/Water | 70/30 | 75 | 15 | — | 20 |
| Test Example 14 | Production Example 5 | 110 | 2-Propanol/Water | 50/50 | 75 | The membrane was not fine. | | |

What is claimed is:

1. A method of producing a zeolite membrane having CHA crystal structure on an intermediate layer on a porous support, wherein Si/Al (a molar ratio) of CHA zeolite particles is from 9.5 to 100.5 and, in an X-ray diffraction pattern obtained by applying X-ray onto a surface of the zeolite membrane, a peak intensity near 2θ=18° is less than 0.5 times a peak intensity near 2θ=21°, and/or a peak intensity near 2θ=10° is less than 4 times a peak intensity near 2θ=21°, the method comprising:
   forming the zeolite membrane having the CHA crystal structure on the intermediate layer on the porous support by hydrothermal synthesis, using an aqueous reaction mixture including a Si element source, an Al element source, an alkali source, and an organic template,
   wherein non-dealuminated FAU zeolite is used as the Si element source and the Al element source, and
   wherein the intermediate layer provides a surface on which the zeolite membrane is formed, the intermediate layer having an average pore size of the intermediate layer 0.1 to 1 μm and the porous support having an average pore size 10 to 50 μm so that the porous support is not in contact with the zeolite membrane.

2. The method of producing a zeolite membrane according to claim 1, wherein seed crystals are used in the hydrothermal synthesis, and the seed crystals are prepared by hydrothermal synthesis using an aqueous reaction mixture including a Si element source, an Al element source, an alkali source, and an organic template with FAU zeolite used as the Si element source and the Al element source.

3. The method of producing a zeolite membrane according to claim 2, wherein a particle size of CHA crystals is 100 nm to 1 μm.

4. A separation method comprising:
   contacting a liquid or gas mixture containing a compound to be separated with a zeolite membrane, so as to allow permeation of a highly permeative substance for separating the compound from the mixture,
   wherein the zeolite membrane has CHA crystal structure on an intermediate layer on a porous support, the intermediate layer providing a surface on which the zeolite membrane is formed the intermediate layer having an average pore size of 0.1 to 1 μm and the porous support having an average pore size of 10 to 50 μm so that the porous support is not in contact with the zeolite membrane,
   wherein Si/Al (a molar ratio) of CHA zeolite particles is from 9.5 to 100.5 and, in an X-ray diffraction pattern obtained by applying X-ray onto a surface of the zeolite membrane, a peak intensity near 2θ=18° is less than 0.5 times a peak intensity near 2θ=21°, and/or a peak intensity near 2θ=10° is less than 4 times a peak intensity near 2θ=21°, with the lower limit of the ratio of (the peak intensity near 2θ=18°)/(the peak intensity near 2θ=21°) being 0.1 and the lower limit of the ratio of (the peak intensity near 2θ=10°)/(the peak intensity near 2θ=21°)being 1, and
   wherein the mixture containing the compound to be separated is a mixture of acetic acid and water having water content of 30 wt % or more. and if the separation is performed under conditions of a temperature of 75° C. and a pressure difference across the membrane of 1 atm, then a permeation flux is 10 kg/(m$^2$h) or higher and a water concentration in a permeate is 99 wt % or higher.

5. The separation method according to claim 4, wherein the mixture containing the compound to be separated is a mixture of 2-propanol and water having water content of 10 wt % or more, and if the separation is performed under conditions of a temperature of 75° C. and a pressure difference across the membrane of 1 atm, then a permeation flux is 10 kg/(m$^2$h) or higher and a water concentration in a permeate is 99 wt % or higher.

6. The separation method according to claim 4, wherein the mixture containing the compound to be separated is a mixture of acetic acid and water having water content of 30 wt % or more, and if the separation is performed under conditions of a temperature of 75° C. and a pressure difference across the membrane of 1 atm, then a permeation flux is 10 kg/(m$^2$h) or higher and a water concentration in a permeate is 99 wt % or higher.

7. The separation method according to claim 4, wherein the mixture containing the compound to be separated is a mixture gas of carbon dioxide and methane, ammonia, or sulfur hexafluoride having carbon dioxide content of 50 wt % or more, and if the separation is performed under conditions of a temperature of 40° C. and a pressure difference across the membrane of 3 atm, then a permeance of carbon dioxide is 1×10$^{-6}$ mol/(m$^2$sPa) or higher.

8. The separation method according to claim 4, wherein the mixture containing the compound to be separated is a mixture gas of carbon dioxide and methane, ammonia, or sulfur hexafluoride having carbon dioxide content of 50 wt % or more, and if the separation is performed under conditions of a temperature of 100 to 120° C. and a pressure difference across the membrane of 3 atm, then a permeance of carbon dioxide is 1×10$^{-7}$ mol/(m$^2$sPa) or higher.

9. The separation method according to claim 4, wherein a particle size of CHA crystals is 100 nm to 1 μm.

* * * * *